United States Patent
Ferrin et al.

(10) Patent No.: US 11,475,763 B2
(45) Date of Patent: Oct. 18, 2022

(54) SEMANTIC INFORMATION SHARING IN AUTONOMOUS VEHICLES

(71) Applicant: Autonomous Solutions, Inc., Mendon, UT (US)

(72) Inventors: Jeff Ferrin, Mendon, UT (US); Taylor Bybee, Mendon, UT (US); Nate Bunderson, Mendon, UT (US)

(73) Assignee: Autonomous Solutions, Inc., Mendon, UT (US)

( * ) Notice: Subject to any disclaimer, the term of this patent is extended or adjusted under 35 U.S.C. 154(b) by 349 days.

(21) Appl. No.: 16/791,748

(22) Filed: Feb. 14, 2020

(65) Prior Publication Data

US 2020/0286369 A1 Sep. 10, 2020

Related U.S. Application Data

(60) Provisional application No. 62/806,420, filed on Feb. 15, 2019.

(51) Int. Cl.
| | |
|---|---|
| G08G 1/01 | (2006.01) |
| G06K 9/00 | (2022.01) |
| H04W 4/46 | (2018.01) |
| H04W 4/029 | (2018.01) |
| G01C 21/34 | (2006.01) |
| G06V 20/56 | (2022.01) |
| G06F 16/11 | (2019.01) |

(52) U.S. Cl.
CPC ....... *G08G 1/0112* (2013.01); *G01C 21/3461* (2013.01); *G06V 20/56* (2022.01); *H04W 4/029* (2018.02); *H04W 4/46* (2018.02); *G06F 16/11* (2019.01)

(58) Field of Classification Search
CPC .... G08G 1/0112; G08G 1/22; G01C 21/3461; G01C 21/3841; G06V 20/56; G06V 20/58; H04W 4/029; H04W 4/46; H04W 4/021; H04W 4/40; G06F 16/11; G06F 16/13
See application file for complete search history.

(56) References Cited

U.S. PATENT DOCUMENTS

| | | | |
|---|---|---|---|
| 9,120,484 B1 * | 9/2015 | Ferguson | B60W 30/08 |
| 9,140,792 B2 * | 9/2015 | Zeng | G01S 19/45 |
| 10,317,903 B2 * | 6/2019 | Shashua | G08G 1/096725 |

* cited by examiner

*Primary Examiner* — Brian P Sweeney (57) ABSTRACT

Systems and methods are disclosed for a semantic information sharing within a group of autonomous ground vehicles. In some embodiments, a method may include sensing an environment near a first autonomous vehicle to produce first environmental data; creating a first mathematical model representing the environment near the first autonomous vehicle based on the first environmental data; sending a request for additional environmental data to a second autonomous vehicle; receiving a second mathematical model from the second autonomous vehicle; and merging the second mathematical model with the first mathematical model.

22 Claims, 9 Drawing Sheets

SEMANTIC INFORMATION SHARING IN AUTONOMOUS VEHICLES

BACKGROUND

In normal operation, an autonomous vehicle may control its operation, for example, based on high level instructions. For instance, an autonomous vehicle may be capable of operating with limited or even no human direction beyond the high level instructions. As such, an autonomous vehicle may be utilized in a wide array of operations, particularly when operation is relatively predictable. An autonomous vehicle may interact and work with a group of autonomous vehicles in a work area and/or may convoy as a group as they travel.

SUMMARY

Systems and methods are disclosed for semantic information sharing within a group of autonomous ground vehicles. In some embodiments, a method may include sensing an environment near a first autonomous vehicle to produce first environmental data; creating a first mathematical model representing the environment near the first autonomous vehicle based on the first environmental data; sending a request for additional environmental data to a second autonomous vehicle; receiving a second mathematical model from the second autonomous vehicle; and merging the second mathematical model with the first mathematical model.

In some embodiments, the first mathematical model comprises environmental data arranged in a first array of cells and the second mathematical model comprises environmental data arranged in a second array of cells. In some embodiments, the array of cells correspond to a geolocation relative to the first autonomous vehicle or the second autonomous vehicle. In some embodiments, in the event a cell of the first array of cells is invalid, entering data from a corresponding cell of the second array of cells. In some embodiments, in the event a cell of the first array of cells is valid a corresponding cell of the second array of cells is valid, applying a weighted average to the cell of the first array of cells and the corresponding cell of the second array of cells.

In some embodiments, the environment data comprises data selected from the group consisting of terrain data, slippage data, georeferenced data, ego-centric data, and/or obstacle data.

In some embodiments, merging the second mathematical model with the first mathematical model further includes applying a weighted average to the data in the first mathematical model and the second mathematical model.

In some embodiments, the request for additional environmental data includes geolocation data.

In some embodiments, the request for additional environmental data includes an indication specifying the type of environmental data.

In some embodiments, the method may also include receiving a third mathematical model from a third autonomous vehicle; and merging the third mathematical model with the first mathematical model and the second mathematical model.

In some embodiments, merging the second mathematical model with the first mathematical model comprises replacing the first mathematical model with the second mathematical model.

Some embodiments include an autonomous vehicle comprising: an environmental sensor; an transceiver; and a controller in communication with the environmental sensor and the transceiver. In some embodiments, the controller: receives first environmental data representing the environment near the autonomous vehicle from the environmental sensor; creates a first mathematical model representing the environment near the autonomous vehicle based on the first environmental data; sends a request for additional environmental data to a second autonomous vehicle via the transceiver; receives a second mathematical model from the second autonomous vehicle via the transceiver; and merges the second mathematical model with the first mathematical model.

In some embodiments, the first mathematical model comprises environmental data arranged in a first array of cells, and wherein the second mathematical model comprises environmental data arranged in a second array of cells.

In some embodiments, the array of cells correspond to a geolocation relative to the first autonomous vehicle or the second autonomous vehicle. In some embodiments, in the event a cell of the first array of cells is invalid, entering data from a corresponding cell of the second array of cells. In some embodiments, in the event a cell of the first array of cells is valid a corresponding cell of the second array of cells is valid, applying a weighted average to the cell of the first array of cells and the corresponding cell of the second array of cells.

In some embodiments, the environment data comprises data selected from the group consisting of terrain data, slippage data, georeferenced data, ego-centric data, and/or obstacle data.

In some embodiments, merging the second mathematical model with the first mathematical model further comprises applying a weighted average to the data in the first mathematical model and the second mathematical model.

In some embodiments, the controller may receive a third mathematical model from a third autonomous vehicle via the transceiver and may merge the third mathematical model with the first mathematical model and the second mathematical model.

In some embodiments, the autonomous vehicle may include a geolocation sensor and the request for additional environmental data includes geolocation data from the geolocation sensor.

Some embodiments may include a non-transitory, tangible computer readable medium communicatively coupled to the one or more processors and storing executable instructions executable by the one or more processors to perform: sensing an environment near a first autonomous vehicle to produce first environmental data; creating a first mathematical model representing the environment near the first autonomous vehicle based on the first environmental data; sending a request for additional environmental data to a second autonomous vehicle; receiving a second mathematical model from the second autonomous vehicle; and merging the second mathematical model with the first mathematical model.

The various embodiments described in the summary and this document are provided not to limit or define the disclosure or the scope of the claims.

DETAILED DESCRIPTION

Sharing information among vehicles in a group of unmanned ground vehicles may allow for improved vehicle performance or may reduce the need for each vehicle to be equipped with a full-suite of sensors. Information such as obstacle data, surface properties, and/or terrain maps may be shared among vehicles and may be useful for vehicle control or high-level behaviors. Some embodiments include a system architecture and/or methods for sharing semantic information among vehicles in a group of vehicles. In some embodiments, update rules may be used to fuse information from different sources in a statistical manner. In some embodiments, algorithms can make decisions about incoming data such as, for example, whether the data is from the vehicle's sensors or the data is semantic information from other vehicles.

Figure 1:
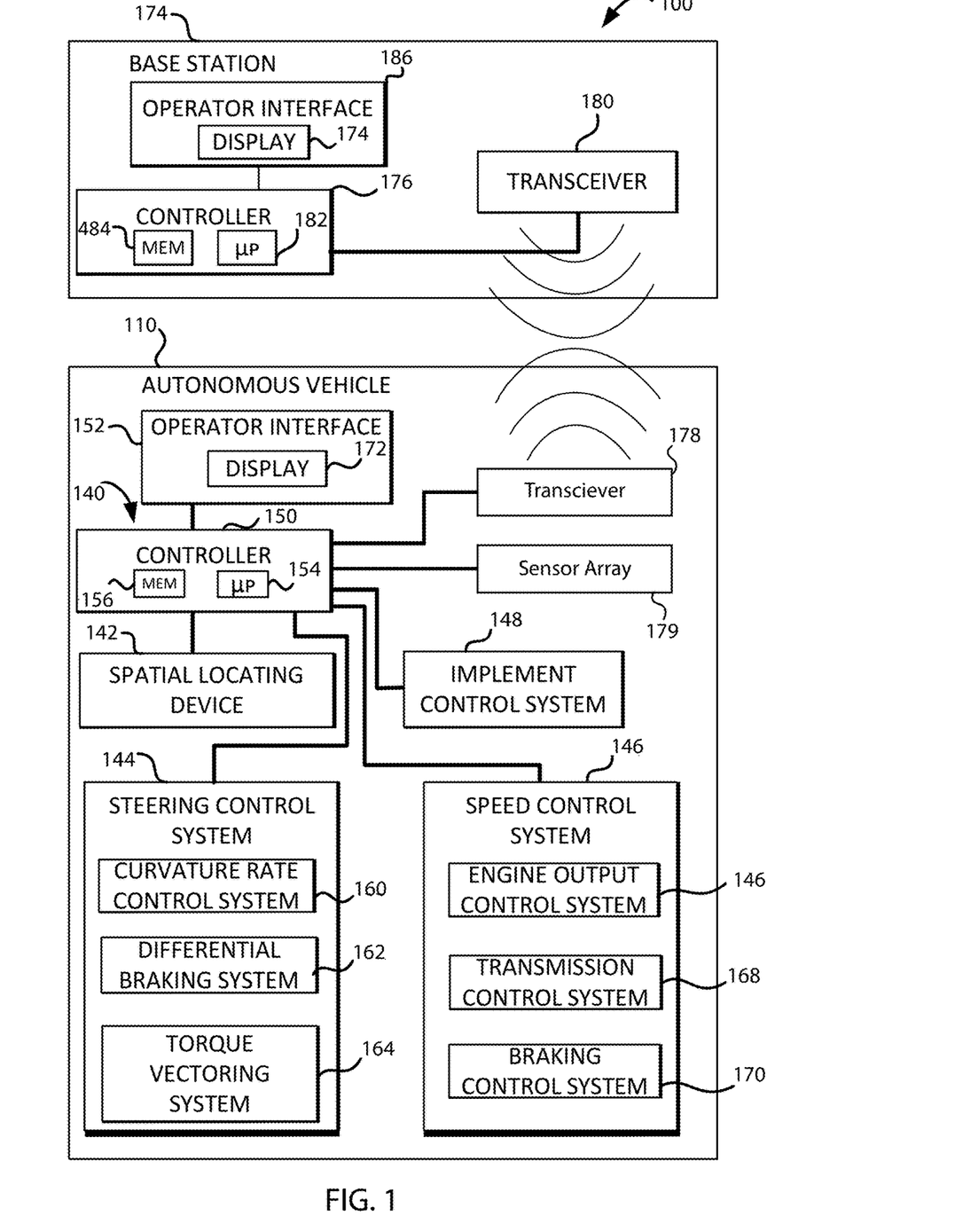
FIG. 1 illustrates a block diagram of an example autonomous vehicle communication system of the present disclosure.
Figure 2:
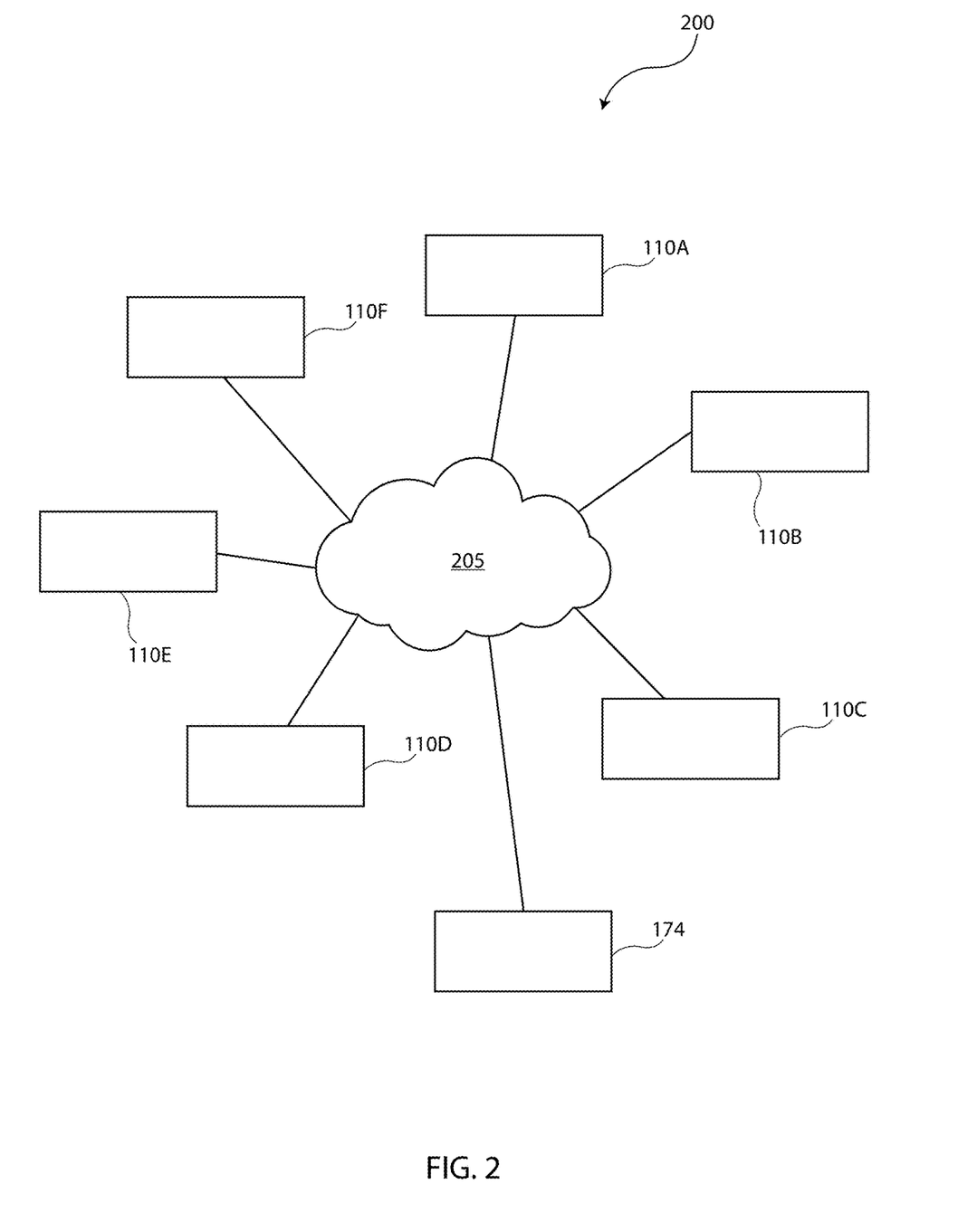
FIG. 2 is a block diagram of a group of autonomous vehicles 200 in communication with each other via a communication network 205.

FIG. 1 is a block diagram of an individual autonomous vehicle 110 in communication with a base station 174 according to some embodiments. FIG. 2 is a block diagram of a group of autonomous vehicles 200 in communication with each other via a communication network 205.

In some embodiments, vehicles in a group vehicles may share various kind of sensor data such as, for example, wheel slippage data, speed, radar data, lidar data, images, or sonar data, etc. In some embodiments, vehicles in a group vehicles may share various kind of sensor derived data such as, for example, obstacles, surface properties, surface disturbances, terrain, paths, path characteristics, environmental characteristics, map data, mathematical models, etc.

Figure 9:
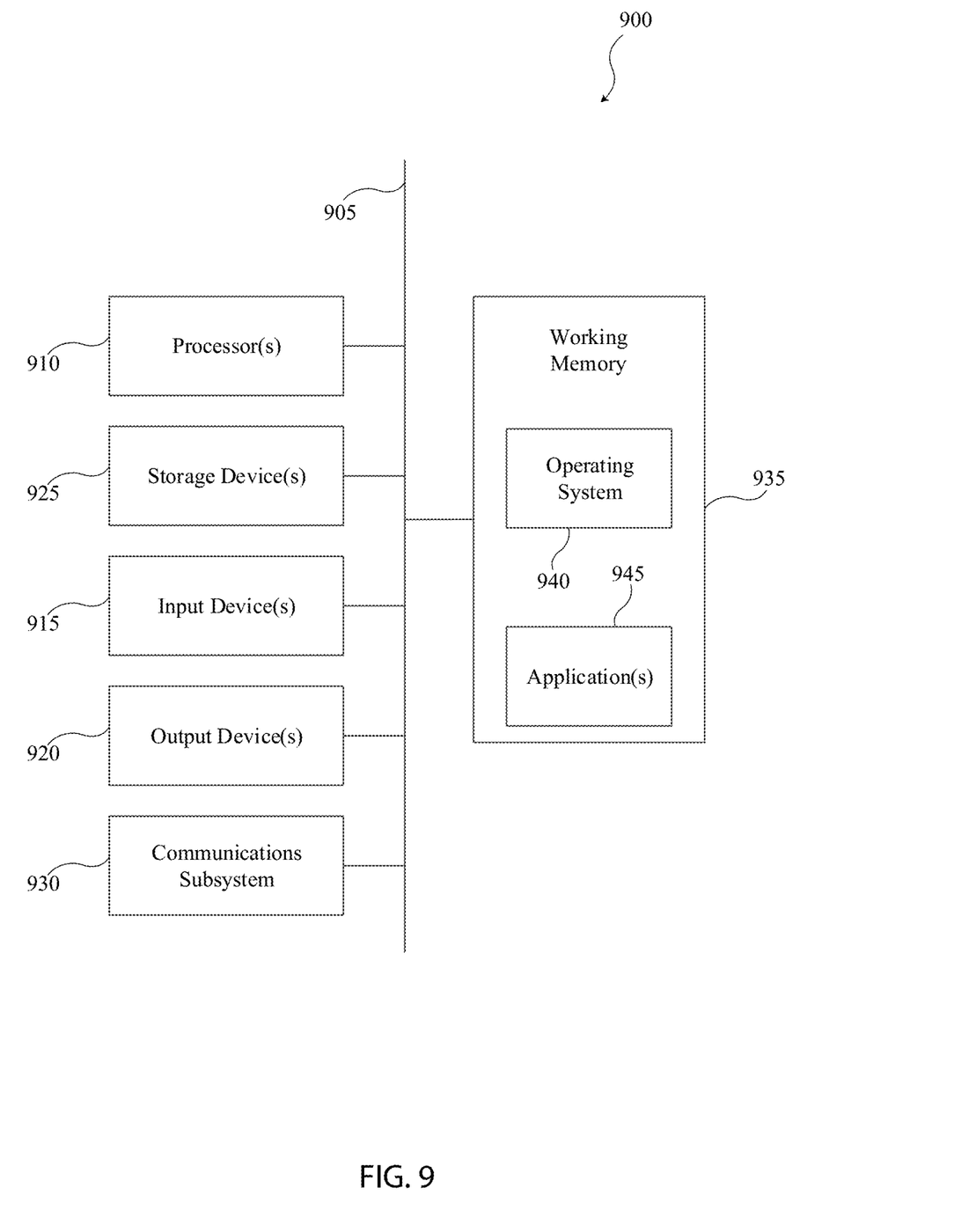
FIG. 9 is a block diagram of a computational system that can be used to with or to perform some embodiments described in this document.

In some embodiments, vehicles in a group of autonomous vehicles may include autonomous ground vehicles in a convoy on a road (e.g., as shown in FIG. 9), autonomous ground vehicles operating at a mine site, autonomous ground vehicles on a farm or ranch, autonomous ground vehicles in a truck yard or shipping yard, autonomous security vehicles, autonomous warehouse vehicles, industrial autonomous vehicles, etc.

In some embodiments, performance of vehicles in a group of autonomous vehicles can be improved by sharing information (e.g., sensor data or sensor derived data) pertinent to vehicle control among the group of vehicles. For example, a vehicle traversing an area and can assess information about an area and pass this information back to other vehicles that have not yet traversed this area. This information may allow for an increased control horizon for the group of autonomous vehicles and/or may allow for some vehicles to operate with fewer sensors.

In some embodiments, information may be shared using a publish-subscribe architecture among autonomous vehicles. In some embodiments, information requests may be broadcast periodically from on vehicle to the group of vehicles, and any of the group of vehicle may respond to those requests. In some embodiments, responses may be broadcast to the group of autonomous vehicles so all the vehicles in the group of autonomous vehicles may use the information.

In some embodiments, limitations may be placed on which vehicles may request information or respond with information. These limitations may include, for example, geographical limitations, hierarchal limitations, or priority-based limitations, etc.

FIG. 1 is a block diagram of a communication and control system 100 that may be utilized in conjunction with the systems and methods of the present disclosure, in at least some embodiments. The communication and control system 100 may include a vehicle control system 140 which may be mounted on an autonomous vehicle 110. The autonomous vehicle 110, for example, may include any type of autonomous vehicle. In some embodiments, the communication and control system 100 may include any or all components of computational unit 900 shown in FIG. 9.

The autonomous vehicle 110, for example, may also include a spatial locating device 142, which may be mounted to the autonomous vehicle 110 and configured to determine a position of the autonomous vehicle 110 as well as a heading and a speed of the autonomous vehicle 110. The spatial locating device 142, for example, may include any suitable system configured to determine the position and/or other characteristics of the autonomous vehicle 110, such as a global positioning system (GPS), a global navigation satellite system (GNSS), or the like. In certain embodiments, the spatial locating device 142 may determine the position and/or other characteristics of the autonomous vehicle 110 relative to a fixed point within a field (e.g., via a fixed radio transceiver). In some embodiments, the spatial locating device 142 may determine the position of the autonomous vehicle 110 relative to a fixed global coordinate system using GPS, GNSS, a fixed local coordinate system, or any combination thereof. In some embodiments, the spatial locating device 142 may include any or all components of computational unit 900 shown in FIG. 9.

In some embodiments, the autonomous vehicle 110 may include a steering control system 144 that may control a direction of movement of the autonomous vehicle 110. In some embodiments, the steering control system 144 may include any or all components of computational unit 900 shown in FIG. 9.

In some embodiments, the autonomous vehicle 110 may include a speed control system 146 that controls a speed of the autonomous vehicle 110. In some embodiments, the autonomous vehicle 110 may include an implement control system 148 that may control operation of an implement towed by the autonomous vehicle 110 or integrated within the autonomous vehicle 110. In some embodiments, the implement control system 148 may, for example, may include any type of implement such as, for example, a bucket, a shovel, a blade, a dump bed, a plow, an auger, a trencher, a scraper, a broom, a hammer, a grapple, forks, boom, spears, a cutter, a tiller, a rake, etc. In some embodiments, the speed control system 146 may include any or all components of computational unit 900 shown in FIG. 9.

In some embodiments, the control system 140 may include a controller 150 communicatively coupled to the spatial locating device 142, the steering control system 144, to the speed control system 146, and the implement control system 148. In some embodiments, the control system 140 may be integrated into a single control system. In other embodiments, the control system 140 may include a plurality of distinct control systems. In some embodiments, the control system 140 may include any or all the components show in FIG. 9.

In some embodiments, the controller 150 may receive signals relative to many parameters of interest including, but not limited to: vehicle position, vehicle speed, vehicle heading, desired path location, off-path normal error, desired off-path normal error, vehicle state vector information, curvature state vector information, turning radius limits, steering angle, steering angle limits, steering rate limits, curvature, curvature rate, rate of curvature limits, roll, pitch, rotational rates, acceleration, and the like, or any combination thereof.

In some embodiments, the controller 150 may be an electronic controller with electrical circuitry configured to process data from the spatial locating device 142, among other components of the autonomous vehicle 110. The controller 150 may include a processor, such as the processor 154, and a memory device 156. The controller 150 may also include one or more storage devices and/or other suitable components (not shown). The processor 154 may be used to execute software, such as software for calculating drivable path plans. Moreover, the processor 154 may include multiple microprocessors, one or more "general-purpose" microprocessors, one or more special-purpose microprocessors, and/or one or more application specific integrated circuits (ASICS), or any combination thereof. For example, the processor 154 may include one or more reduced instruction set (RISC) processors or complex instruction set computer (CISC). In some embodiments, the controller 150 may include any or all the components show in FIG. 9.

In some embodiments, the memory device 156 may include a volatile memory, such as random access memory (RAM), and/or a nonvolatile memory, such as ROM. The memory device 156 may store a variety of information and may be used for various purposes. For example, the memory device 156 may store processor-executable instructions (e.g., firmware or software) for the processor 154 to execute, such as instructions for calculating drivable path plan, and/or controlling the autonomous vehicle 110. The memory device 156 may include flash memory, one or more hard drives, or any other suitable optical, magnetic, or solid-state storage medium, or a combination thereof. The memory device 156 may store data such as field maps, maps of desired paths, vehicle characteristics, software or firmware instructions and/or any other suitable data.

In some embodiments, the steering control system 144 may include a curvature rate control system 160, a differential braking system 162, and a torque vectoring system 164 that may be used to steer the autonomous vehicle 110. In at least one embodiment, the curvature rate control system 160 may control a direction of an autonomous vehicle 110 by controlling a steering system of the autonomous vehicle 110 with a curvature rate, such as an Ackerman style autonomous vehicle 110. In other embodiments, the curvature rate control system 160 may automatically rotate one or more wheels or tracks of the autonomous vehicle 110 via hydraulic actuators to steer the autonomous vehicle 110. By way of example, the curvature rate control system 160 may rotate front wheels/tracks, rear wheels/tracks, and/or intermediate wheels/tracks of the autonomous vehicle 110, either individually or in groups. The differential braking system 162 may independently vary the braking force on each lateral side of the autonomous vehicle 110 to direct the autonomous vehicle 110. Similarly, the torque vectoring system 164 may differentially apply torque from the engine to the wheels and/or tracks on each lateral side of the autonomous vehicle 110. While the illustrated steering control system 144 includes the curvature rate control system 160, the differential braking system 162, and the torque vectoring system 164, it should be appreciated that alternative embodiments may include one or more of these systems, in any suitable combination. Further embodiments may include a steering control system 144 having other and/or additional systems to facilitate turning the autonomous vehicle 110 such as an articulated steering system, a differential drive system, and the like.

In some embodiments, the speed control system 146 may include an engine output control system 166, a transmission control system 168, and a braking control system 170. The engine output control system 166 may vary the output of the engine to control the speed of the autonomous vehicle 110. For example, the engine output control system 166 may vary a throttle setting of the engine, a fuel/air mixture of the engine, a timing of the engine, and/or other suitable engine parameters to control engine output. In addition, the transmission control system 168 may adjust gear selection within a transmission to control the speed of the autonomous vehicle 110. Furthermore, the braking control system 170 may adjust braking force to control the speed of the autonomous vehicle 110. While the illustrated speed control system 146 includes the engine output control system 166, the transmission control system 168, and the braking control system 170, it should be appreciated that alternative embodiments may include one or two of these systems, in any suitable combination. Further embodiments may include a speed control system 146 having other and/or additional systems to facilitate adjusting the speed of the autonomous vehicle 110.

In some embodiments, the implement control system 148 may control various parameters of the implement towed by and/or integrated within the autonomous vehicle 110. For example, the implement control system 148 may instruct an implement controller via a communication link, such as a CAN bus or ISOBUS.

The implement control system 148, as another example, may instruct the implement controller to adjust a bucket height, a bucket angle, a bucket position, etc.

In some embodiments, the vehicle control system 100 may include a sensor array 179. In some embodiments, the sensor array 179 may facilitate determination of condition(s) of the autonomous vehicle 110 and/or the work area. For example, the sensor array 179 may include multiple sensors (e.g., infrared sensors, ultrasonic sensors, magnetic sensors, radar sensors, Lidar sensors, terahertz sensors, sonar sensors, etc.) that monitor a rotation rate of a respective wheel or track and/or a ground speed of the autonomous vehicle 110. The sensors may also monitor operating levels (e.g., temperature, fuel level, etc.) of the autonomous vehicle 110. Furthermore, the sensors may monitor conditions in and around the work area, such as temperature, weather, wind speed, humidity, and other conditions. In some embodiments, the sensors may detect physical objects in the work area, such as the parking stall, the material stall, accessories, other vehicles, other obstacles, or other object(s) that may in the area surrounding the autonomous vehicle 110. The detected physical objects may be mapped in software creating a digital representation of the sensed area such as, for example, as GPS data or GPS points forming one or more polygons. Further, the sensor array 179 may be utilized by the first obstacle avoidance system, the second obstacle avoidance system, or both.

In some embodiments, the controller 150 may include computational unit 900.

The operator interface 152 may be communicatively coupled to the controller 150 and configured to present data from the autonomous vehicle 110 via a display 172. Display data may include: data associated with operation of the autonomous vehicle 110, data associated with operation of an implement, a position of the autonomous vehicle 110, a speed of the autonomous vehicle 110, a desired path, a drivable path plan, a target position, a current position, etc. The operator interface 152 may enable an operator to control certain functions of the autonomous vehicle 110 such as starting and stopping the autonomous vehicle 110, inputting a desired path, etc. In some embodiments, the operator interface 152 may enable the operator to input parameters that cause the controller 150 to adjust the drivable path plan. For example, the operator may provide an input requesting that the desired path be acquired as quickly as possible, that an off-path normal error be minimized, that a speed of the autonomous vehicle 110 remain within certain limits, that a lateral acceleration experienced by the autonomous vehicle 110 remain within certain limits, etc. In addition, the operator interface 152 (e.g., via the display 172, or via an audio system (not shown), etc.) may alert an operator if the desired path cannot be achieved, for example.

In certain embodiments, the control system 140 may include a base station 174 having a base station controller 176 located remotely from the autonomous vehicle 110. For example, in certain embodiments, control functions of the control system 140 may be distributed between the controller 150 of the autonomous vehicle control system 140 and the base station controller 176. In certain embodiments, the base station controller 176 may perform a substantial portion of the control functions of the control system 140. For example, in certain embodiments, a first transceiver 178 positioned on the autonomous vehicle 110 may output signals indicative of vehicle characteristics (e.g., position, speed, heading, curvature rate, curvature rate limits, maximum turning rate, minimum turning radius, steering angle, roll, pitch, rotational rates, acceleration, etc.) to a second transceiver 180 at the base station 174 or to other first transceivers on other autonomous vehicles via a wireless network.

In some embodiments, the base station controller 176 may calculate drivable path plans and/or output control signals to control the curvature rate control system 144, the speed control system 146, and/or the implement control system 148 to direct the autonomous vehicle 110 toward the desired path, for example. The base station controller 176 may include a processor 182 and memory device 184 having similar features and/or capabilities as the processor 154 and the memory device 156 discussed previously. Likewise, the base station 174 may include an operator interface 186 having a display 188, which may have similar features and/or capabilities as the operator interface 152 and the display 172 discussed previously.

FIG. 2 is a block diagram of a group of autonomous vehicles 110 in communication with each other via a communication network 205. In this example, the autonomous vehicles 110 may also be in communication with the base station 174 via the network 205. In this example, six autonomous vehicles are shown: autonomous vehicle 110A, autonomous vehicle 110B, autonomous vehicle 110C, autonomous vehicle 110D, autonomous vehicle 110E, autonomous vehicle 110F (individually or collectively referred to as autonomous vehicle 110).

In some embodiments, the base station 174 may be located at a fixed location, in the cloud, or on one or more of the autonomous vehicles 110.

In some embodiments, the network 205 may include any type of wireless communication network such as, for example, a 5G network, a 4G network, an LTE network, a Wi-Fi network, a cellular network, etc. In some embodiments, the network 205 may be established or maintained on one or more of the autonomous vehicles 110.

Figure 3:
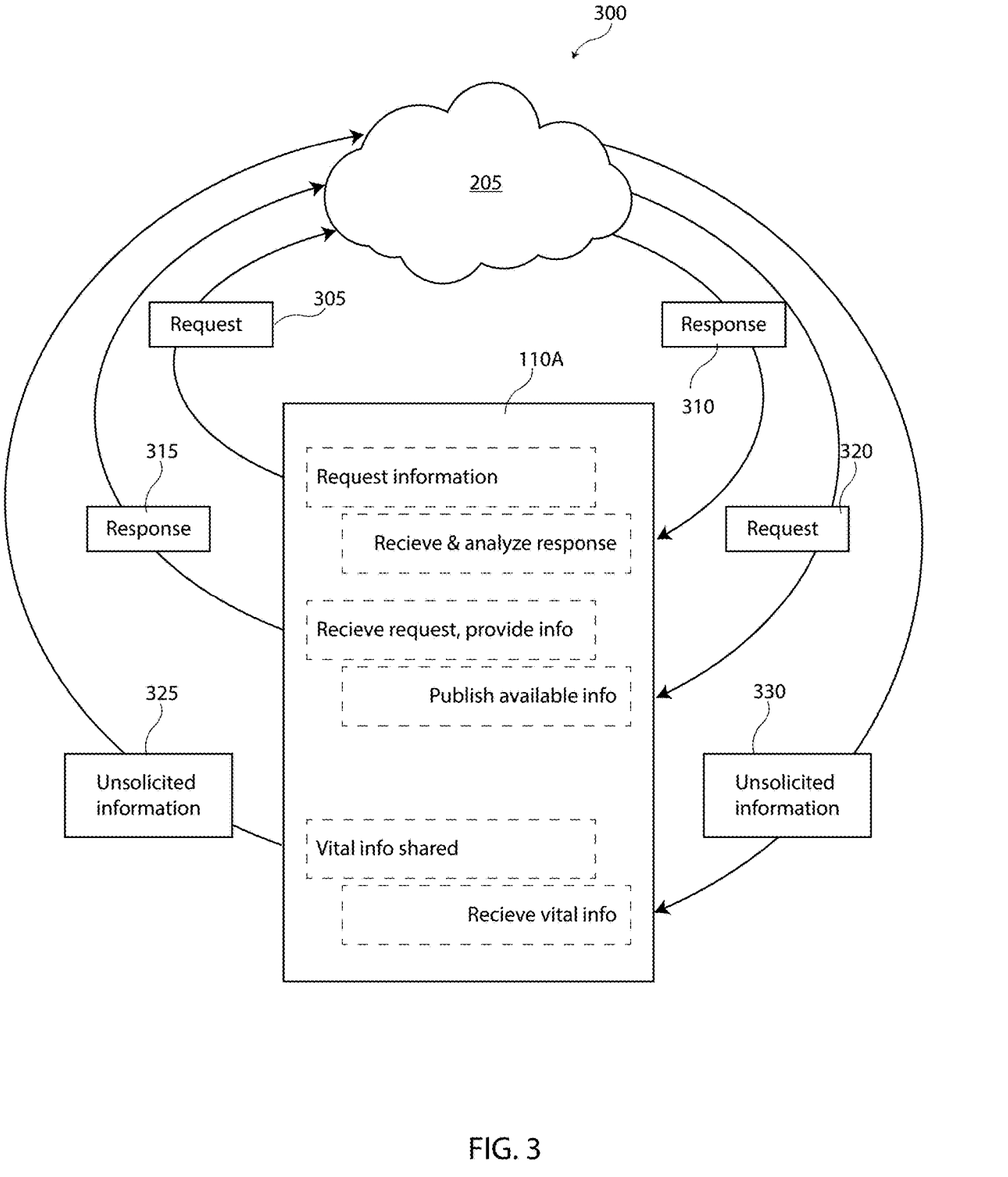
FIG. 3 is a block diagram of a publish-subscribe architecture that can be used within the group of autonomous vehicles according to some embodiments.

FIG. 3 is a block diagram of a publish-subscribe architecture 300 that can be used within a group of autonomous vehicles (e.g., the group of autonomous vehicles 200) according to some embodiments. In some embodiments, due to network bandwidth and latency constraints, it may be unreasonable to send raw sensor data from one autonomous vehicle to another within the group of autonomous vehicles. 200. In some embodiments, in the publish-subscribe architecture 300 semantic information may be shared among autonomous vehicles in a group of autonomous vehicles. The semantic information, for example, may include a mathematical model based on sensor data. As another example, the semantic information may include compressed data. As another example, the semantic information may include filtered sensor data. As another example, the semantic information may not include raw sensor data. As another example, the semantic information may include sensor data fitted to a mathematical model.

In some embodiments, the semantic information may include data that has been compressed by fitting sensor data to a mathematical model. The model, for example, may include a model representing path disturbances, a terrain map, an occupancy grid, an obstacle list, an occlusion map, a slope map, GPS points, an array of GPS points representing one or more polygons, etc. In some embodiments, each autonomous vehicle 110 of the group of autonomous vehicles 200 may maintain a mathematical model and may share this mathematical model with other autonomous vehicles 110 of the group of autonomous vehicles 200.

For example, the autonomous vehicle 110A of the group of autonomous vehicles 200 can broadcast an information request 305 to the other autonomous vehicles (e.g., 110B, 110C, 110D, 110E, 110F, etc.) of the group of autonomous vehicles 200 through the network 205. Each or a subset of the group of autonomous vehicles may receive this request, determine if any of the requested information is available, then broadcasts a response 310. In some embodiments, the autonomous vehicle 110A may receive a response from more than one autonomous vehicle of the group of autonomous vehicles. The requesting vehicle 110A may receive all the semantic responses, analyze the data, and/or combine this received information with its own model. In some embodiments, this may result, for example, in a more complete model.

As another example, the autonomous vehicle 110A of the group of autonomous vehicles 200 may receive an information request 320 from one or more of the other autonomous vehicles (e.g., 110B, 110C, 110D, 110E, 110F, etc.) of the group of autonomous vehicles 200 through the network 205. The autonomous vehicle 110A may receive this request, determine if any of the requested information is available, and broadcasts a response 315.

As another example, the autonomous vehicle 110A of the group of autonomous vehicles 200 may determine that there may be some mission-critical information such as, for example, the existence of an obstacle, a steep slope, tire slippage, occlusions, GPS points, an array of GPS points representing one or more polygons, etc. The autonomous vehicle 110A may broadcast this mission-critical information as unsolicited information 325 to each autonomous vehicle of the group of autonomous vehicles 200.

The autonomous vehicle 110A may also receive mission-critical information as unsolicited information 330 from other autonomous vehicles of the group of autonomous vehicles 200.

In some embodiments, each autonomous vehicle may have a responsibility to broadcast an information request 305 or 320 to other autonomous vehicles. These broadcasts may occur periodically or may be based on a trigger such as, for example, a time based trigger, a location based trigger, an operator based trigger, a system trigger, an external trigger, event trigger, a sensed obstacle trigger, a trigger based on sensed data, etc. For example, location based data (e.g., and may be static over time) may be a location based trigger that may include a broadcast when an autonomous vehicle enters a new area based on geolocation data. As another example, for data that changes over time such as, for example, coordinates of moving obstacles or vehicles, etc., may include a trigger that is repeated periodically such as, for example, every 5, 10, 15, 30, etc. minutes.

Ad hoc triggers may also occur such as, for example, when an autonomous vehicle detects an obstacle in close proximity to any of the autonomous vehicles in the group of autonomous vehicles, the autonomous vehicle may warn the other autonomous vehicles without waiting for the request-response sequence to occur (e.g., unsolicited information 325). For example, an autonomous vehicle may broadcast this information using the unsolicited message communication sequence. An ad hoc trigger, for example, may occur when time-sensitive or mission-critical information needing to be immediately shared.

When an autonomous vehicle receives information, either in the request-response or unsolicited sequence, it may merge this information into its own model. Information-merging, for example, may allow for each autonomous vehicle to maintain control of its model while still using the information from nearby autonomous vehicles. The algorithm(s) used to merge the incoming information into existing information may dependent on what model is being shared and may use statistical or tuning information to merge the information.

For example, a Kalman filter or a Bayesian prediction algorithm may be used to merge the received information with its own model.

In some embodiments, data received from other vehicles may be weighted prior to or during a merge. For example, data from an autonomous vehicle known to include additional sensors, better sensors, or alternative sensors may be more highly weighted. As another example, data from a lead autonomous vehicle in a convoy of vehicles may be more heavily weighted than other autonomous vehicles in the convoy.

In some embodiments, to limit the amount of request and response network traffic, some restrictions can be placed on which vehicles can send or receive certain types of information. For example, in a convoy where the leader autonomous vehicle may not need any information from a follower autonomous vehicle. A leader autonomous vehicle may be restricted from sending any requests 305. As another example, an autonomous vehicle (e.g., a follower autonomous vehicle) may not have a full-sensor suite, and, thus, may not respond to some requests. This concept allows for the information shared to remain independent or close-to-independent.

In some embodiments, the publish-subscribe architecture may use a data distribution device algorithm.

Figure 4:
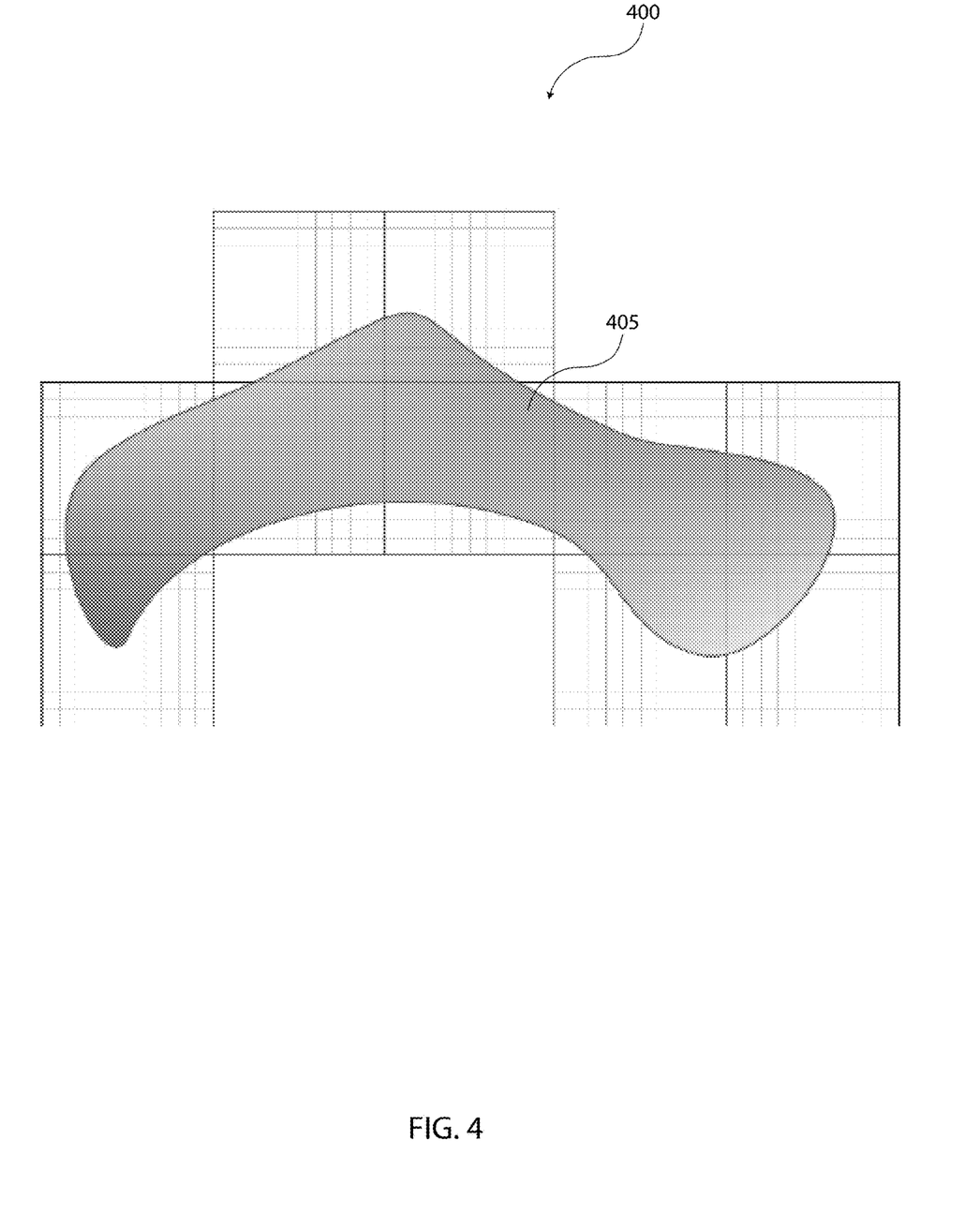
FIG. 4 shows an example heightmap model of the terrain surrounding a vehicle.

Some embodiments may use a semantic information-sharing architecture for terrain modeling. FIG. 4 shows an example heightmap model of the terrain surrounding a vehicle. Various techniques may be used to create a height-map model. For example, a LiDAR sensor mounted on a vehicle may generate a point cloud. Using mounting location and vehicle-to-map location, these points in the point cloud may be transformed into the map frame and inserted into a heightmap.

The heightmap 400 may include a list of square tiles, each containing an NN×NN array of height measurements representing some MM×MM-meter area in space. The list, for example, may maintain only tiles present near vehicle operating areas. Each vehicle may maintain a tiled heightmap with respect to a common georeferenced origin, the tiles are referenced to one another by an xxxx-offset from the map origin. This allows for spatial tile registration between vehicles. In some embodiments, the heightmap may include elevation data, elevation variance data, slope data, valid data flags, invalid data flags, predicted data flags, estimated data flags, etc.

In some embodiments, a first autonomous vehicle may sense the surrounding terrain (e.g., with a LiDAR sensor) and maintains a heightmap. A second autonomous vehicle, who may follow at some time-lag or distance-lag, may periodically broadcast a request for terrain information. The request, for example, may include a list of tile coordinates. Each of the autonomous vehicles may receive this request. Other autonomous vehicles may receive this request, examine the list of tiles currently maintained, and, if any requested information is present, broadcast a response message containing the terrain information associated with the tile coordinates. The first autonomous vehicle, in particular, may respond with the heightmap associated with the tile coordinates.

Figure 5:
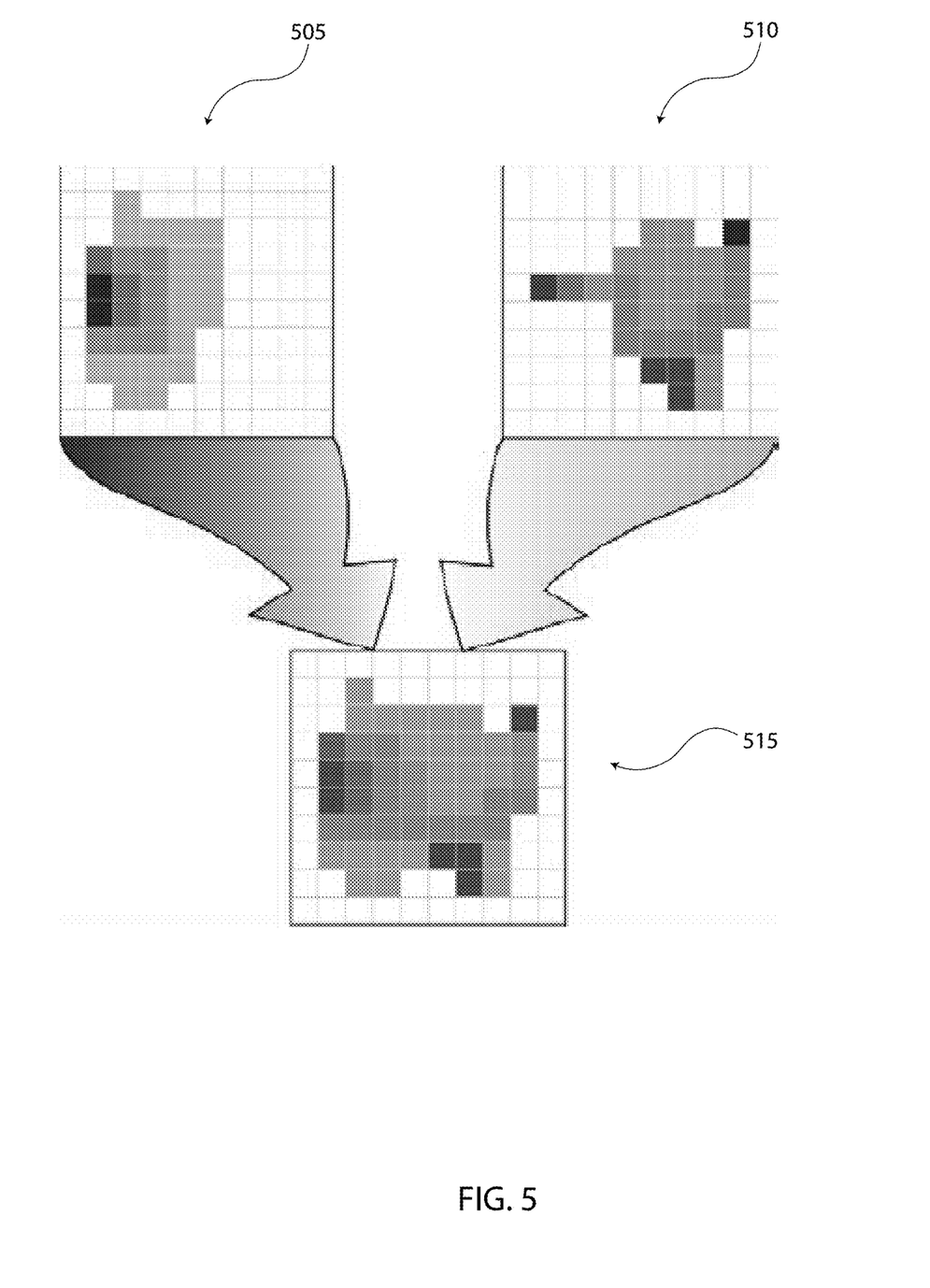
FIG. 5 is an example of merging two tiles representing the same area but from two different autonomous vehicle according to some embodiments.

The first autonomous vehicle may receive several responses to its request from the group of autonomous vehicles. These responses may be merged with the requesting vehicle's tile list on a tile-by-tile basis. Various merge techniques may be use. For example, two tiles representing the same area but from two different autonomous vehicle can be merged as shown in FIG. 5.

Each tile may include both valid measurements and invalid measurements (e.g., resulting from not being sensed) in each grid cell. If only one cell includes valid measurements, then the merged cell takes the valid value. If neither cell includes valid measurements, then the merged cell takes on an invalid flag. If both cells include valid measurements, the merged cell may include a weighted average of the two cells. The weights used in this average can be tuned (e.g., either manually or using machine learning) on a cell-by-cell basis and may not be linear function of the inputs. The weighting, for example, may more heavily weight information from the first autonomous vehicle more than incoming information from a second autonomous vehicle. The weighting, for example, may more heavily weight information from an autonomous vehicle with better sensing equipment than information from an autonomous vehicle with lesser sensing equipment. The weighting, for example, may more heavily weight information that is not estimated or predicted over data that is estimated or predicted.

Figure 6:
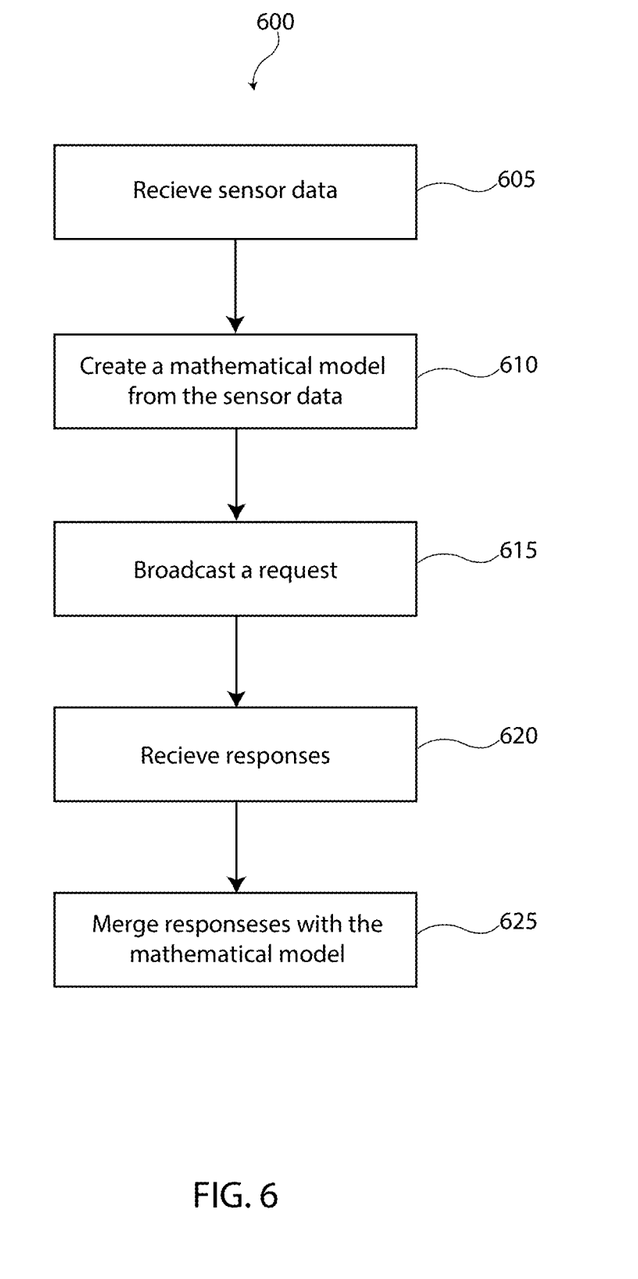
FIG. 6 is a flowchart of a process publish requesting sensor data according to some embodiments.

FIG. 6 is a flowchart of a process 600 publish requesting sensor data according to some embodiments. Process 600 may include additional blocks. The blocks shown in process 600 may occur in any order. One or more blocks shown in process 600 may be replaced with another block or removed.

At block 605 sensor data may be received from sensors mounted on the autonomous vehicle. These sensors may include any kind of sensor such as, for example, infrared sensors, ultrasonic sensors, magnetic sensors, radar sensors, Lidar sensors, terahertz sensors, sonar sensors.

At block 610 a mathematical model may be created from the sensor data. The mathematical model, for example, may include data map. The data map, for example, may associate sensor data with a physical location such as, for example, in an array grid. Any type of mathematical model may be used. The mathematical model may model terrain, slippage, obstacles, etc.

At block 615 a request may be broadcast to other autonomous vehicles. The request, for example, may include coordinate data specifying the coordinates where for which data is requested. The request may include other information such as, for example, geolocation data, time data, etc.

At block 620 one or more responses may be received. These responses may include sensor data from other autonomous vehicles with data specifying values for specific cordites.

At block 625 the one or more responses may be merged with the mathematical model. Various merge techniques may be used to merge the received data. For example, where the mathematical model has data gaps, the response data (e.g., a weighted or non-weighted average) may be incorporated into the gaps. If data exists in the mathematical model, the response data may be weighted averaged with the mathematical model data.

Figure 7:
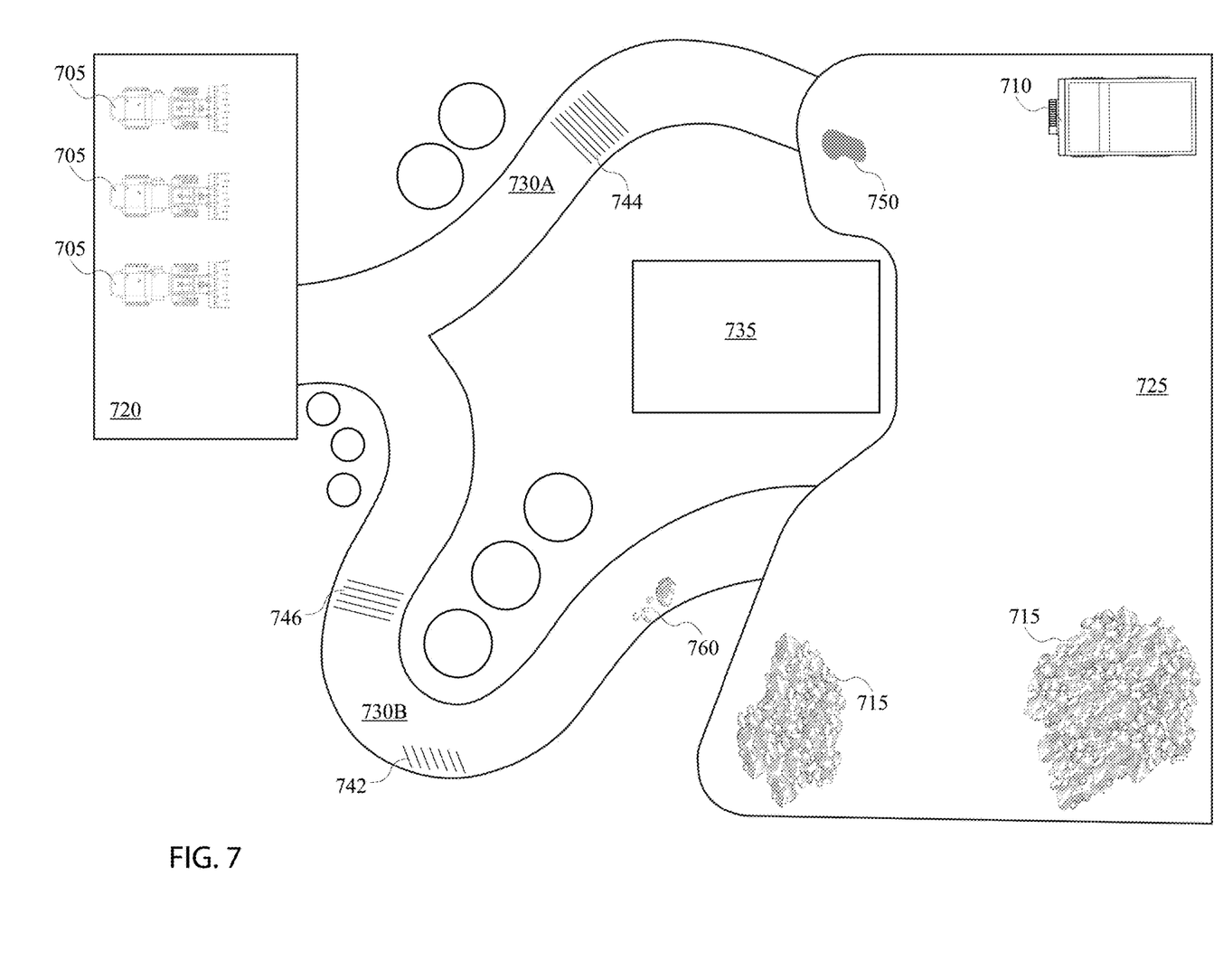
FIG. 7 is an illustration of an worksite where a group of autonomous vehicles may work.

FIG. 7 is an illustration of an worksite where a group of autonomous vehicles may work. In some embodiments, the worksite includes a park zone 720, a work zone 725, and paths 730A (individually and collectively 730) according to some embodiments. In some embodiments, the boundaries of the park zone 720, the path 730, or the work zone may be defined within a mapping software such as, for example, at a base station.

In some embodiments, the park zone 720 may be located a distance from, be contiguous with, overlap with, or be part of work zone 725. The park zone 720 may include one or more autonomous loaders 705 parked in a shutdown state. The park zone 720 may include autonomous loaders 705 that are not in use, parked, broken, under inspection, stored, under maintenance, etc. In some embodiments, a work site may include a plurality of park zones 720. The park zone 720, for example, may include buildings, maintenance crews, etc.

In some embodiments, the work zone 725 is an area were the autonomous loader works such as, for example, by interacting with other vehicles and/or load zones 715. In some embodiments, the work zone 725 may include various other vehicles such, for example, dump truck 710. The work zone 725, for example, may include one or more load zones 715. The load zone 715, for example, may include any type of potential load that that may be loaded by the autonomous loader 705. The load zone 715, for example, may include material in a pile, mound, ground, subsurface, hillside, etc. as well as material dumped from a conveyor, loader, dump truck, belly dump, etc. As another example, the material may include rock, sand, rubble, ore, tailings, chemicals, fertilizers, waste, organic materials, foodstuffs, manufacturing wastes, slag byproducts, food products, rock, salt corn, etc.

In some embodiments, the path 730 may include a plurality of paths. The path 730, for example, may be a road between work zone 725 and park zone 715 or between two different work zones. In some embodiments, the path 730 may include slope 742, slope 744, or slope 746. The path 730 may also include some obstacles like rubble 760.

In some embodiments, the work zone 720 may include a wet area 750 where tires often slip. Slippage can be measured from axle and/or transmission sensors.

In some embodiments, a path 730 may be one way or bidirectional. For example, path 730A may be a one way path from the park zone 720 to the work zone 725 and the path 730B may be a one way path from the work zone 725 to the park zone 720.

In this work zone, the autonomous vehicles may follow the various embodiments described in this document. For example, a first autonomous loader 705 may drive through path 730A and encounter the slope 744. In doing so, the autonomous loader 705 may create a mathematical model of the terrain from data collected by the various sensors such as, for example, a heightmap. A second autonomous loader 705 may approach the slope 744, create a second heightmap from sensor data, and send a request for terrain data at or near that location. The request may indicate the geolocation and/or that terrain data is required. The first autonomous loader 705 may respond by sending the heightmap to the second autonomous loader. The second autonomous loader 705 may merge the heightmap sent from the first autonomous loader 705 with the heightmap created at the second autonomous loader.

As another example, the first autonomous loader 705 may encounter the rubble 760 on path 730B or the wet area 750 in the work zone 725. The first autonomous loader 705 may sense these obstacles and create a mathematical model representing the obstacle within the space. Because these obstacles may impact an autonomous loader's 705 ability to follow a path, the first autonomous loader 705 may send an unsolicited message to the other vehicles. This unsolicited message may include data specifying the geolocation, the type of vital information (e.g., obstacle, slick area, etc.), and/or the mathematical model representing the space near the obstacle to each of the autonomous loaders 705 and/or the dump truck 710.

Figure 8:
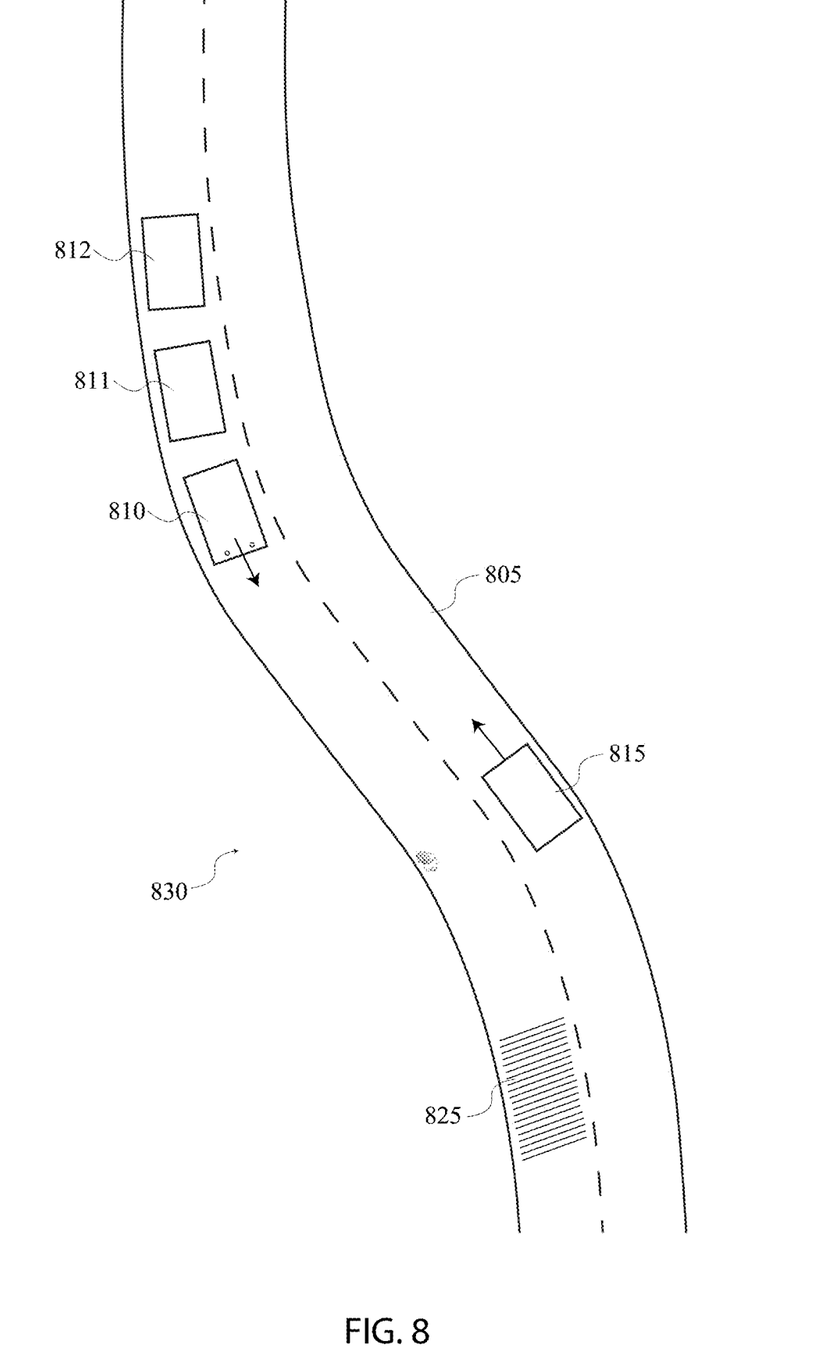
FIG. 8 is another example of a convoy of a group of autonomous vehicles on a road 805 according to some embodiments.

FIG. 8 is another example of a convoy of a group of autonomous vehicles on a road 805 according to some embodiments. In this example, the convoy includes three autonomous vehicles: autonomous vehicle 810, autonomous vehicle 811, and autonomous vehicle 812. The convoy may include any number of vehicles. In this example, as the lead autonomous vehicle 810 may include additional sensors that the other autonomous vehicles 811, 812 may not have. In this way, for example, the lead autonomous vehicle 810 may provide the other autonomous vehicles 811, 812 with sensor data. In this example, the road 805 may include any number of features such as slope 825, obstacles 820, oncoming traffic 815, and a curve 830.

For example, the lead autonomous vehicle 810 may drive along the road 805 and encounter the slope 825. In doing so, the lead autonomous vehicle 810 may create a mathematical model of the terrain from data collected by the various sensors such as, for example, a heightmap. A second autonomous vehicle 811 may approach the slope 825 (the second autonomous vehicle 811 may follow a similar process as it approaches other features in the road) and send a request for terrain data at or near that location. The second autonomous vehicle 811 may or may not be equipped with sensors to create a heightmap or the second autonomous vehicle 811 may have lower quality sensors that can produce a less accurate or viable height map. The request may indicate the geolocation and/or that terrain data is required. The lead autonomous vehicle 810 may respond by sending the heightmap to the second autonomous loader. The second autonomous vehicle 811 may merge the heightmap sent from the lead autonomous vehicle 810 with the heightmap created at the second autonomous vehicle 811.

The computational system 900, shown in FIG. 9 can be used to perform any of the embodiments of the invention. For example, computational system 900 can be used to execute process 600 or implement the publish-subscribe architecture described in this document. As another example, computational system 900 can be used perform any calculation, identification and/or determination described here. Computational system 900 includes hardware elements that can be electrically coupled via a bus 905 (or may otherwise be in communication, as appropriate). The hardware elements can include one or more processors 910, including without limitation one or more general-purpose processors and/or one or more special-purpose processors (such as digital signal processing chips, graphics acceleration chips, and/or the like); one or more input devices 915, which can include without limitation a mouse, a keyboard and/or the like; and one or more output devices 920, which can include without limitation a display device, a printer and/or the like.

The computational system 900 may further include (and/or be in communication with) one or more storage devices 925, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 900 might also include a communications subsystem 930, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 930 may permit data to be exchanged with a network (such as the network described below, to name one example), and/or any other devices described in this document. In many embodiments, the computational system 900 will further include a working memory 935, which can include a RAM or ROM device, as described above.

The computational system 900 also can include software elements, shown as being currently located within the working memory 935, including an operating system 940 and/or other code, such as one or more application programs 945, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 925 described above.

In some cases, the storage medium might be incorporated within the computational system 900 or in communication with the computational system 900. In other embodiments, the storage medium might be separate from a computational system 900 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 900 and/or might take the form of source and/or installable code, which, upon compilation and/or installation on the computational system 900 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
   sensing an environment near a first autonomous vehicle to produce first environmental data;
   creating a first mathematical model representing the environment near the first autonomous vehicle based on the first environmental data;
   sending a request for additional environmental data to a second autonomous vehicle;
   receiving a second mathematical model from the second autonomous vehicle;
   merging the second mathematical model with the first mathematical model;
   sharing the merged mathematical model with a group of autonomous vehicles, wherein the group of autonomous vehicles comprises at least the first autonomous vehicle and the second autonomous vehicle; and
   controlling, via a control system, the group of autonomous vehicles based on the merged mathematical model, by increasing control horizon of the group of autonomous vehicles, wherein the control system comprises a controller and a plurality of distinct control systems.

2. The method according to claim 1, wherein the first mathematical model comprises environmental data arranged in a first array of cells, and wherein the second mathematical model comprises environmental data arranged in a second array of cells.

3. The method according to claim 2, wherein the array of cells correspond to a geolocation relative to the first autonomous vehicle or the second autonomous vehicle.

4. The method according to claim 2, wherein merging the second mathematical model with the first mathematical model further comprises:
   in the event a cell of the first array of cells is invalid, entering data from a corresponding cell of the second array of cells.

5. The method according to claim 2, wherein merging the second mathematical model with the first mathematical model further comprises:
   in the event a cell of the first array of cells is valid a corresponding cell of the second array of cells is valid, applying a weighted average to the cell of the first array of cells and the corresponding cell of the second array of cells.

6. The method according to claim 1, wherein the environment data comprises data selected from the group consisting of terrain data, slippage data, georeferenced data, ego-centric data, and obstacle data.

7. The method according to claim 1, wherein merging the second mathematical model with the first mathematical model further comprises:
   applying a weighted average to the data in the first mathematical model and the second mathematical model.

8. The method according to claim 1, wherein sending a request for additional environmental data to a second autonomous vehicle includes geolocation data.

9. The method according to claim 1, wherein sending a request for additional environmental data to a second autonomous vehicle includes an indication specifying the type of environmental data.

10. The method according to claim 1, further comprising:
    receiving a third mathematical model from a third autonomous vehicle; and
    merging the third mathematical model with the first mathematical model and the second mathematical model.

11. The method according to claim 1, wherein the merging the second mathematical model with the first mathematical model comprises replacing the first mathematical model with the second mathematical model.

12. An autonomous vehicle comprising:
    a sensor;
    a transceiver; and
    a control system comprising a plurality of distinct control systems and a controller in communication with the sensor and the transceiver, wherein the controller:
       receives first environmental data representing the environment near the autonomous vehicle from the sensor;
       creates a first mathematical model representing the environment near the autonomous vehicle based on the first environmental data;
       sends a request for additional environmental data to a second autonomous vehicle via the transceiver;
       receives a second mathematical model from the second autonomous vehicle via the transceiver;
       merges the second mathematical model with the first mathematical model;
       shares the merged mathematical model with a group of autonomous vehicles, wherein the group of autonomous vehicles comprises at least the first autonomous vehicle and the second autonomous vehicle; and
       controls the group of autonomous vehicles based on the merged mathematical model by increasing control horizon of the group of autonomous vehicles.

13. The autonomous vehicle according to claim 12, wherein the first mathematical model comprises environmental data arranged in a first array of cells, and wherein the second mathematical model comprises environmental data arranged in a second array of cells.

14. The autonomous vehicle according to claim 13, wherein the array of cells correspond to a geolocation relative to the first autonomous vehicle or the second autonomous vehicle.

15. The autonomous vehicle according to claim 13, wherein merging the second mathematical model with the first mathematical model further comprises:
in the event a cell of the first array of cells is invalid, entering data from a corresponding cell of the second array of cells.

16. The autonomous vehicle according to claim 13, wherein merging the second mathematical model with the first mathematical model further comprises:
in the event a cell of the first array of cells is valid a corresponding cell of the second array of cells is valid, applying a weighted average to the cell of the first array of cells and the corresponding cell of the second array of cells.

17. The autonomous vehicle according to claim 12, wherein the environment data comprises data selected from the group consisting of terrain data, slippage data, georeferenced data, ego-centric data, and obstacle data.

18. The autonomous vehicle according to claim 12, wherein merging the second mathematical model with the first mathematical model further comprises:
applying a weighted average to the data in the first mathematical model and the second mathematical model.

19. The autonomous vehicle according to claim 12, wherein the controller:
receives a third mathematical model from a third autonomous vehicle via the transceiver; and
merges the third mathematical model with the first mathematical model and the second mathematical model.

20. The autonomous vehicle according to claim 12, further comprising a geolocation sensor, and wherein the request for additional environmental data includes geolocation data from the geolocation sensor.

21. The autonomous vehicle according to claim 13, wherein merging the second mathematical model with the first mathematical model comprises replacing the first mathematical model with the second mathematical model.

22. A non-transitory, tangible computer readable medium communicatively coupled to the one or more processors and storing executable instructions executable by the one or more processors to perform:
sensing an environment, via a sensor, near a first autonomous vehicle to produce first environmental data;
creating a first mathematical model representing the environment near the first autonomous vehicle based on the first environmental data;
sending a request for additional environmental data to a second autonomous vehicle;
receiving a second mathematical model from the second autonomous vehicle;
merging the second mathematical model with the first mathematical model;
sharing the merged mathematical model with a group of autonomous vehicles, wherein the group of autonomous vehicles comprises at least the first autonomous vehicle and the second autonomous vehicle; and
controlling, via a control system, the group of autonomous vehicles based on the merged mathematical model, by increasing control horizon of the group of autonomous vehicles, wherein the control system comprises a controller and a plurality of distinct control systems.

* * * * *